July 7, 1964  G. A. NELSON  3,140,006
PRESSURE VESSEL FOR CONTAINING HYDROGEN OR MIXTURES THEREOF
Filed Sept. 12, 1962

INVENTOR:
GEORGE A. NELSON
BY: *Oswald H. Milmore*
HIS ATTORNEY

United States Patent Office 3,140,006
Patented July 7, 1964

3,140,006
PRESSURE VESSEL FOR CONTAINING HYDROGEN OR MIXTURES THEREOF
George A. Nelson, Berkeley, Calif., assignor to Shell Oil Company, New York, N.Y., a corporation of Delaware
Filed Sept. 12, 1962, Ser. No. 223,199
7 Claims. (Cl. 220—63)

The invention relates to pressure vessels suitable for containing gases which damage metal by diffusion into the metal, such as hydrogen, alone or in admixture with other substances at elevated temperature and pressure. The vessel is useful, for example, for use as a reactor for the hydrogenation or dehydrogenation of hydrocarbons, and the synthesis of ammonia. In such uses the vessel contains hydrogen at elevated temperature and pressure and it is not possible to use ordinary carbon steel directly due to injury to the steel by hydrogen, which diffuses into the metal and causes decarburization, embrittlement and cracking.

The invention is related to vessels having a lining suitable for resisting corrosion by such materials as sulfides, acids and the like.

Vessels for containing hydrogen have been constructed of alloys of iron capable of resisting hydrogen, such as stainless steels, but the cost of such vessels is excessive. It is also known to construct such vesels of a plurality of layers or sections, wherein only the inner layer or layers are resistant to hydrogen and the outer section or sections are of carbon steel; metals proposed for use as the inner layer or layers are alloys of iron containing such metals as chromium, molybdenum, tungsten, vanadium and manganese.

The principle used in such multi-section vessels is that resistant metals are used in the inner section, whereat the temperature and pressure are both high, and that a lower-cost steel is used in the outer section, whereat lower pressure and temperature prevail. It is known that the resistant metals, although serving to confine the fluid pressure, permit hydrogen to diffuse and this hydrogen reaches the inner face of the outer section. It was sought to reduce the effect of this diffused hydrogen on the outer section by providing weep holes therein, to permit the hydrogen to escape to the outside of the vessel and thereby reduce the pressure of hydrogen on the inner face of that section to a low value. It was hoped thereby to prevent diffusion of hydrogen into the metal of the outer section. However, this did not occur and amounts of hydrogen still entered the carbon steel of the outer section through welds used to fasten the liner to outer shell.

Now in accordance with this invention it was found that hydrogen diffused into the outer section of a vessel from the inner section through metallurgical bonds, such as those formed by welding, brazing or rolling as is used in cladding to achieve a unitary two-layer construction. Hydrogen diffuses through such bonds into the outer section although its inner surface is at reduced pressure and leads to deterioration of the outer section when it is constructed of carbon steel, low-alloy steel, or high-strength steel, all commonly known as structural steels.

For example, according to one prior art construction, the cylindrical part of the vessel consists of several concentric layers and a solid head of hydrogen-resistant metal is welded to each of the said layers, such head being provided, for example, as a closure or to provide a flanged opening. One or more of the inner layers are of hydrogen-resistant metal alloy while one or more of the outer layers are of carbon steel. Although the layers may not be metallurgically bonded directly to one another, they are so bonded via the head; thus hydrogen diffuses through the latter into the outer layers of carbon steel. As another example, such a vessel may be formed of two or more axially juxtaposed sections united by a weldment which, although applied in increments, extends as a ring throughout the several layers. This weldment acts as a bridge to permit hydrogen to diffuse into the outer carbon-steel layer or layers.

In the improved construction according to the invention the pressure vessel, having a suitable opening for admitting a fluid, comprises at least two sections which are not metallurgically bonded, either directly or indirectly, the inner section being of or containing a layer of a material which is resistant to deterioration by gas such as hydrogen absorbed in the metal and the outer section having weep holes interconnecting the inner surface thereof with the outside of the vessel; the outer section may then be constructed of carbon steel.

The unbonded liner or inner section can be secured to the outer section in various ways, among which are: (1) The lining can be given a shape which conforms to the contour of the outer shell, including parts which overlie the faces of flanges at nozzles, and these overlying parts can be secured by gaskets pressed against the said flanges by flanges of an attached pipe, cover or the like. (2) Cap screws of hydrogen-resistant metal which have passages for the escape of hydrogen and therefore do not act as conductors for the diffusion of hydrogen into the outer casing may be used. (3) Cap screws of ordinary physical construction may be used in regions beyond the gasketed zone, where the liner is not exposed to hydrogen.

In many instances the inner section may consist of a single metal. More often, however, it will include a plurality of layers of different metals. For example, when the vessel is to contain corrosive fluids the innermost layer may be of a type which resist surface corrosion as well as the effect of gas which diffuses into the metal, and the next layer may thus be selected to withstand only the effects of diffused gas. It will be understood that either the innermost or both of such layers may be sealed to retain the fluid under pressure within the vessel, while the vented outer section affords structural support. Several layers may also be provided when corrosion is not a problem, to take advantage of the temperature gradient through the vessel wall. Thus, the temperature in the innermost layer is usually the highest and the injurious effects of hydrogen and other gases are aggravated at higher temperature. Hence it is possible to use a lower-cost alloy for the outer layer of the inner section.

When the inner section for any reason comprises more than one layer it is preferable to bond the layers, as by soldering, rolling with or without the application of an intermediate metal, such as electroplated nickel, or ultrasonic or explosive welding. When the layers are not bonded the innermost layer must usually be of appreciable thickness to withstand the pressure because it is in such case necessary to vent also the space between the said layers by holes which communicate with the low-pressure passage at the inside of the outer section. This venting is usually necessary to avoid the build-up within the interlayer space of hydrogen which diffuses through the innermost layer and leads to excessively high pressures of hydrogen.

Various metals may be used for the inner section, in accordance with the partial pressure of the hydrogen or other injurious gas and the prevailing temperatures, as well as in accordance with the corrosive nature of the vessel contents. In general, the inner section of the vessel contains at least 0.005 percent of one or of several carbide stabilizing metals of the class consisting of boron, chromium, vanadium, molybdenum, tungsten, titanium and columbium to resist decarburization or cracking by hydrogen.

The operating limits for a few steels in hydrogen service at various temperatures and partial pressures of hydrogen are described by the inventior in "Metals for High-Pressure Hydrogenation Plants" in the Transactions of the ASME, vol. 73, 1951, pages 205–213. A chart on page 207 shows in solid lines resistance to hydrogen attack. For example, at a temperature of 800° F. and a hydrogen partial pressure of 1500 lbs./sq. in., a 2.0 chrome, 0.5 molybdenum steel would be suitable for the inner section.

Resistance to nitrogen deterioration is attained by alloys high in nickel, such as 15 chrome, 35 nickel steel.

Resistance of various metal alloys against corrosion by $H_2S$ is described by W. H. Sharp and E. W. Haycock in "Sulfide Scaling Under Hydrorefining Conditions" in Proceedings of the American Petroleum Institute, vol. 39 [III], 1959, pages 74–91.

When chloride corrosion is a problem hastelloy and monel metal high in nickel content is suitable.

The foregoing and the specific example to be described are but representative of various metals which may be used in accordance with this invention.

The invention will be further described with reference to the accompanying drawing showing an exemplary embodiment, wherein.

Figure 4:
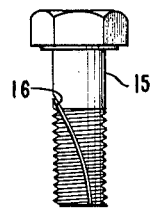
FIGURE 4 is an elevation view showing a cap screw suitable for bolting the inner section and outer sections.

Referring to the drawing, the vessel comprises an outer shell or section 1 of carbon steel or high-strength steel which may be formed of separate portions such as a plurality of main portions 2, 3, a nozzle 4 and a bolting flange 5, united by welds 6. This section has a plurality of gas-escape ports 7 extending to the atmosphere which may, if desired, be connected externally of the shell by tubing, not shown, to a detector for detecting excessive loss of gas thus indicating failure of the liner. The shell contains an inner section 8, consisting of two layers 9 and 10 which may be bonded together, as by rolling the layers of different metals to form a unitary sheet. These may also be assembled from parts by welds 11. The inner section is shaped to conform to the inner surface of the shell but is not metallurgically bonded thereto. The inner section includes an upper part 12 which overlies part of the bolting flange 5 and is pressed against the latter by a gasket 13 which is sealed against a connected fitting 14.

Figure 2:
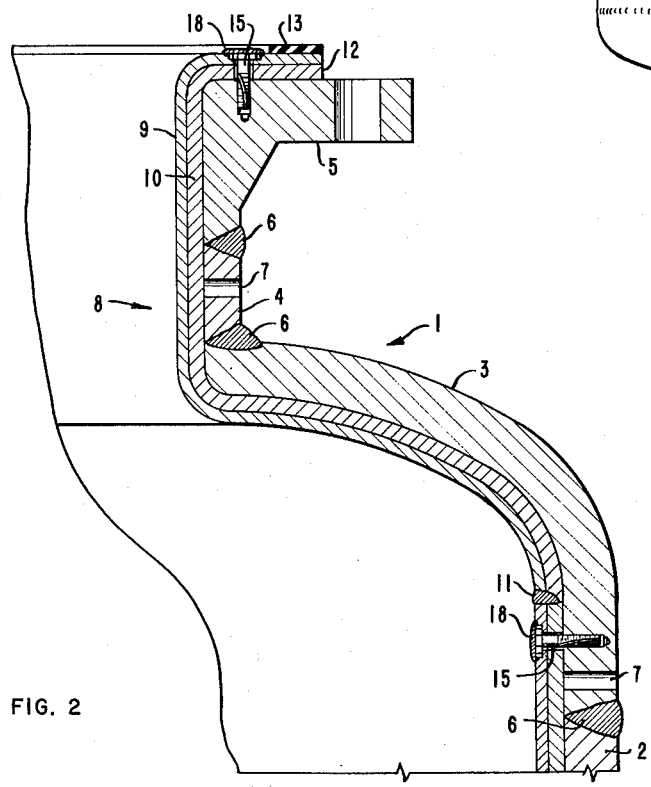
FIGURE 2 is an enlarged sectional view of a part of said vessel.
Figure 3:
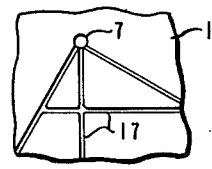
FIGURE 3 is an elevation of a part of the interior face of the outer section.

In the case of large vessels additional mechanical means for securing the inner section may be provided. One such expedient is the use of threaded cap screws 15. As is shown in FIGURE 4, such a cap screw has a groove 16 extending over the threads to permit gas to flow into the low-pressure space between the inner and outer sections. To permit gas entering this space through said grooves and by diffusion through the inner section to reach the escape ports 7 one or both of the juxtaposed surfaces may be scored, as appears at 17 in FIGURE 3. As appears in FIGURE 2, the heads of these cap screws may be recessed into the inner section and may be ground off to lie flush with the inner surface of the lining, and are covered by an overlay 18 applied by welding to the layer 9 and to the head of each screw 15. The cap screws 15 and overlay welds 18 must both be of alloy which is resistant to permanent damage by hydrogen. In some installations the overlays 18 must further be resistant to other gases, such as $H_2S$ and nitrogen.

Figure 5:
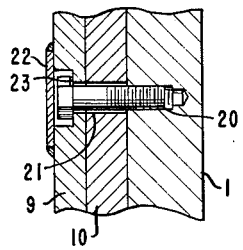
FIGURE 5 is an enlarged sectional view of a part of the wall of the vessel showing an alternative means for securing the inner section.
Figure 1:
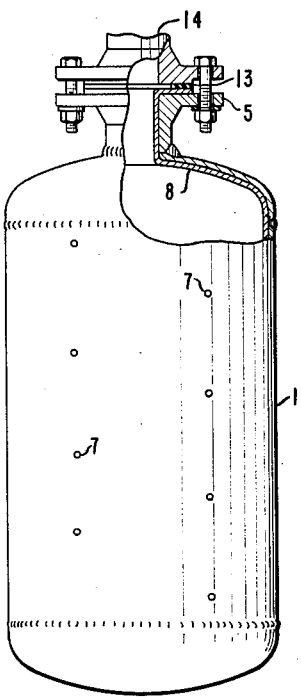
FIGURE 1 is an elevation view, partly in section, of a multi-section vessel constructed according to the invention.

As shown in FIGURE 5, specially mounted cap screws which need not be of hydrogen-resistant alloy may be used for securing the inner and outer sections. Each cap screw 20 is tapped into the outer shell and passes through the inner layers 9 and 10 in an aperture 21 of such size as to provide a clearance around the shank of the cap screw. As shown, the head of each cap screw is recessed within the inner wall of layer 9 and the outer face thereof is preferably recessed below the face of the layer 9. A disc seal 22 having the same composition as the inner layer 9 or similarly resistant to damage by gases is welded to the inner layer 9 by a bead weldment but not to the cap screw 20. By this construction the cap screws 20 are not metallurgically bonded to the inner layer 9 and thereby provision may be made for limited relative movement between the section 9–10 and the shell which might be caused by temperature changes.

To prevent the accumulation of hydrogen in the space beneath the seal 22 the latter must be in communication with the annular space surrounding the shank of the cap screw and within the aperture 21. This may be provided, for example, by a radical serration or slot 23 formed in lower surface of the cap screw head.

The weldments 11, when used, are applied using care to avoid forming a bond to the outer section, as by applying this sheet of metal against the outer section. These welds are made in accordance with standard practice, e.g., the inner and outer parts thereof may be of different weld metals which are the same as or are compatible with the layers 9 and 10.

As a specific example, the inner section 8 may include an inner layer 9 of 18-chrome, 8-nickel stainless steel, bonded to an outer of 1-chrome, 1-molybdenum steel. These layers may be ⅛ inch and ⅝ inch thick, respectively. Both of these steels are resistant to deterioration by hydrogen diffusion and the inner layer is, further, resistant to corrosion by sulfides.

By thus avoiding all metallurgical bonding between the inner and outer sections hydrogen does not diffuse into the outer section and carbon steel or high-strength steel can be used in its fabrication. This results in a considerable economy without making a concession to safety.

It will be understood that the inner section may be fabricated in accordance with usual engineering practice to allow for differential thermal expansion, as by crimping it circumferentially and/or vertically. Also, fittings for the distribution of process fluids and the like may be installed by bolting to the inner section or through it to the outer section, using cap screws as shown at 15. These expedients are not shown, being not a part of the invention.

I claim as my invention:
1. A pressure vessel comprising:
    (a) a shell including an inner and an outer section providing a gas-flow passage therebetween, said shell having an opening extending through both sections for admitting fluid into the inner section,
    (b) the inner section including a layer of metal resistant to deterioration by gas absorption and the outer section being protected by the inner section from injury by gas absorption,
    (c) said inner section being free from metallurgical bond with the outer section and extending through said opening in the outer section with the external surface of said inner section in contact with the outer section and presenting at the inner surface of said extended part of the inner section a sealing face adapted for engagement by a sealing element of a flow conduit, and
    (d) said outer section having holes extending therethrough and establishing communication between said gas-flow passage and the outside of the vessel for discharging gas passing through the inner section.
2. A pressure vessel for containing hydrogen under pressure at elevated temperature constructed as defined in claim 1 wherein said inner section includes a layer of a metal alloy resistant to decarburization and embrittlement by hydrogen and said outer section is constructed of structural steel.

3. A pressure vessel as defined in claim 2 wherein said inner section comprises a plurality of layers of which the inner layer is bonded to the outer layer.

4. A pressure vessel as defined in claim 2 wherein said inner section comprises a plurality of layers of which the inner layer is resistant to corrosion by fluids within the vessel and the outer layer is resistant to deterioration by hydrogen which diffuses through said inner layer.

5. A pressure vessel as defined in claim 4 wherein said inner and outer layers of the inner section are bonded over their common areas to form a unitary wall.

6. A pressure vessel as defined in claim 2 wherein said metal alloy contains at least 0.005 percent of one or more carbide stabilizing metals of the class consisting of boron, chromium, vanadium, molybdenum, tungsten, titanium and columbium.

7. A pressure vessel as defined in claim 6 wherein said metal alloy contains at least 0.4 percent of chromium and at least 0.4 percent of molybdenum.

References Cited in the file of this patent

UNITED STATES PATENTS

| | | |
|---|---|---|
| 1,925,118 | Stresau | Sept. 25, 1933 |
| 2,209,290 | Watts | July 23, 1940 |
| 2,243,240 | Zerbe | May 27, 1941 |